United States Patent Office

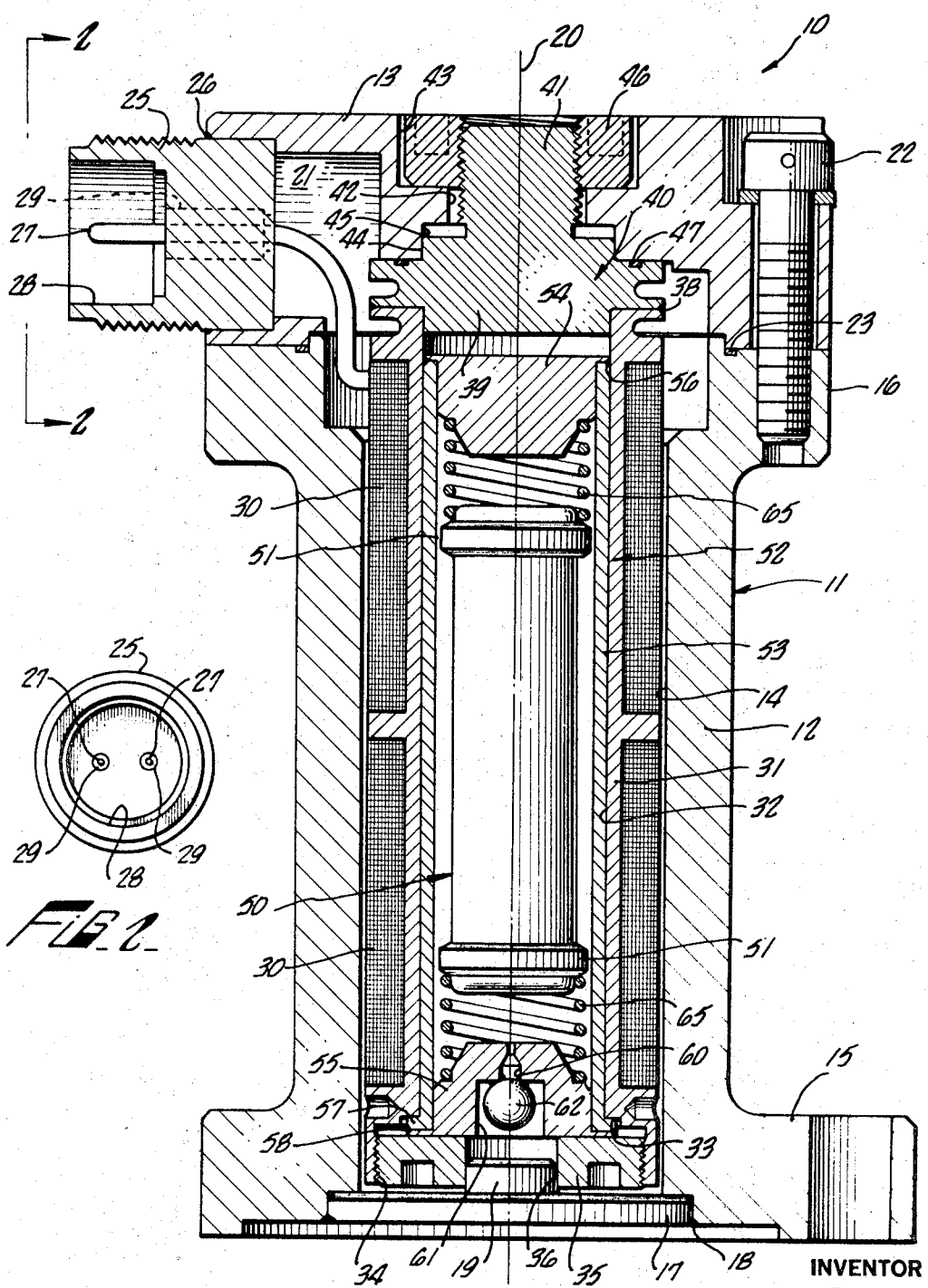

3,553,726
Patented Jan. 5, 1971

3,553,726
VIBROMETER WITH SEALED MAGNET CAPSULE
Michael T. Zimmerman, West Covina, Calif., assignor to Bell & Howell Company, Pasadena, Calif., a corporation of Illinois
Continuation-in-part of application Ser. No. 714,502, Mar. 20, 1968. This application July 30, 1969, Ser. No. 846,209
The portion of the term of the patent subsequent to Aug. 26, 1986, has been disclaimed
Int. Cl. H02k 33/16, 35/02
U.S. Cl. 310—15     3 Claims

ABSTRACT OF THE DISCLOSURE

An instrument vibrometer in which a magnet is mounted for reciprocation within a sealed capsule, the capsule being removably held within a coil, both the coil and the direction of movement of the magnet being aligned with a sensitive axis of the vibrometer within a vibrometer housing. The seal of the magnet capsule assures that the bearings which mount the magnet within the capsule for movement relative to the coil cannot become clogged by foreign matter entering the housing.

CROSS-REFERENCE TO RELATED APPLICATION

This application is a continuation-in-part of my copending application Ser. No. 714,502 filed Mar. 20, 1968, now Pat. 3,463,946 issued Aug. 26, 1969.

BACKGROUND OF THE INVENTION

Field of the invention

This invention pertains to instrument vibrometers of the movable magnet, stationary coil type. More particularly, it pertains to such vibrometers in which the magnet is mounted for movement within a sealed capsule removably mounted within the coil.

Review of the prior art

A vibrometer is an instrument transducer which develops an output signal the value of which is proportional to the velocity of vibrations and displacements applied to the instrument. Vibrometer output signals may be integrated to determine the amount of displacement produced by a particular vibration.

A common type of vibrometer, presently enjoying wide use, includes an elongate coil which is aligned with a sensitive axis of the vibrometer within a housing for the device. The coil conventionally is mounted in fixed relation to the housing. A permanent magnet is spring-loaded within the housing for movement coaxially of the coil. The magnet acts as a seismic mass which tends to remain stationary as the housing and the coil are moved in response to vibrations applied to the housing along the sensitive axis at a frequency above the natural frequency of the magnet suspension. Relative movement between the coil and the magnet results in the generation of an electrical signal within the coil, which signal is measured to determine the velocity of vibrations producing such relative movement.

The movable magnet conventionally is an elongate cylindrical element which is disposed within a bearing sleeve. The magnet itself, at each of its opposite ends, carries a circumferential bearing ring, often made of gold-palladium alloy. The bearing rings cooperate with the inner walls of the bearing sleeve to provide low-friction, guiding support for the magnet. The bearing sleeve is disposed within a support spindle for the coil.

Volume users of existing vibrometers can ill afford to spend the time and money to return a vibrometer to the manufacturer each time the vibrometer fails for any reason. For this reason, in response to user demands, it is standard practice to make such instruments field repairable. Field repairability in turn requires that the instrument housing be openable. Bolted and gasketed housing closures, however, breath is use. Also, field repairs are not usually made by persons having the high level of skill of the manufacturer and are rarely made under the same conditions of cleanliness as the original instruments, with the result that foreign matter frequently is left in or enters the bearing sleeve during the field repair operation. Thus, the principal cause of failure of existing magnet-and-coil vibrometers is now recognized to follow directly from field repairability specifications imposed by the users of such instruments and from the field repair procedures practiced by the users. The problem of foreign matter contamination cannot realistically be overcome by hermetically sealing the instrument housings because the users of the instruments insist upon being able to repair such instruments themselves in the field; also it is desirable to have access to the interior of the housing for the purposes of repairing failures not produced by foreign matter contamination.

In view of the relative simplicity of their construction, magnet-and-coil vibrometers fail or require repair only for limited reasons, but in existing vibrometers these few reasons produce a very high number of failures. Foreign matter may enter the vibrometer housing and cause clogging of the ring-sleeve bearings, in which case the bearings must be cleaned; the presence of foreign matter in the bearing sleeve is the greatest cause of vibrometer failure. After extended use, the bearing rings may become so abraded and worn that replacement of the magnet, with its bearing rings, and the bearing sleeve is required; this is the next most frequent cause of vibrometer failure but is considerably less common than failure by reason of clogged bearings. Another cause of failure is separation of a conductor in the coil.

It should also be understood that in prior magnet-and-coil vibrometers, all the internal components of the vibrometer are disposed in a common chamber within the housing, the chamber being closed in use of the vibrometer by a closure cap which is bolted and gasketed to the housing.

Magnet-and-coil vibrometers are extensively used to monitor engine vibration in commercial and military aircraft powered by jet or gas turbine engines. Such aircraft are operated at altitudes from zero to 40,000 feet or more. In such applications, especially where the vibrometer is mounted close to the engine, the vibrometer must operate through a temperature range extending from sub-zero temperatures to approximately 700° F., and through an ambient pressure range extending from one standard atmosphere down to a minor fraction of a standard atmosphere. No matter how much care is exercised in gasketing the housings of existing magnet-and-coil vibrometers, the housings of such vibrometers "breath" in use. Breathing occurs as air flows out of the housing in going from low altitudes to high altitudes, and as air and dust enter the housing in going from high altitudes to low altitudes. As a result, the bearings in such vibrometers rapidly become contaminated with foreign matter such that the magnets stick in their bearing sleeves and do not function to generate the desired signals. Even slight sticking of the magnet is a serious problem in vibrometers of the magnet-and-coil type.

SUMMARY OF THE INVENTION

This invention provides a practical, effective and efficient solution to the problem reviewed above. The present vibrometer, of the magnet-and-coil type, complies with user imposed requirements of field repairability yet uses seals to significantly reduce, if not altogether eliminate, the adverse effects of foreign matter in the interface between the magnet bearing rings and the bearing sleeve.

Generally speaking, the present invention provides a vibrometer which includes an openable housing. A coil is disposed in the housing in alignment with a sensitive axis of the vibrometer, the coil being fixed relative to the housing. A magnet is disposed in the housing for movement along the sensitive axis within the coil in response to vibration forces applied to the housing along the sensitive axis. In this context, the improvement provided by this invention comprises a sealed container disposed within the coil and within which the magnet is disposed for movement as aforesaid. Means are provided for removably mounting the container within and in fixed relation to the housing.

Thus, the moving parts of the vibrometer are located in a sealed container where dust and dirt breathed into the housing cannot cause harm. Also, the housing is openable to permit access to the coil for field repair thereof.

DESCRIPTION OF THE DRAWINGS

The above-mentioned and other features of this invention are more fully set forth in the following detailed description of the invention, which description is presented with reference to the accompanying drawings, wherein:

FIG. 1 is a cross-sectional elevation view of a magnet-and-coil vibrometer; and

FIG. 2 is an elevation view taken along line 2—2 of FIG. 1.

DESCRIPTION OF THE PREFERRED EMBODIMENT

An instrument vibrometer 10 includes a housing 11 defined by a body 12 and a closure cap 13. The body defines an internal axial bore 14. An external peripheral mounting flange 15 is provided at the lower end of the body and an external peripheral flange 16 is provided at the upper end of the body for cooperation with the closure cap. The lower end of bore 14 is sealed by a closure disk 17 which is welded to the body as at 18. The upper surface of the closure disk defines a short centering pin 19 which extends along the axis of bore 14, the axis of bore 14 being the sensitive axis 20 of the vibrometer.

Closure cap 13 defines an internal chamber 21 which communicates with the upper end of body bore 14 when the cap is secured to the body by bolts 22 threaded into body flange 16. An O-ring gasket 23 provides a separable seal between the closure cap and flange 16 when the cap is bolted to the body.

An externally threaded connector component body 25 is hermetically sealed to cap 13, as by weld 26. As shown in FIG. 2, a pair of terminal members 27 extend from adjacent the upper end of body bore 14 through body 25 to ends disposed within a recess 28 formed in body 25. The terminal members are hermetically sealed to the connector body by ceramic insulator sleeves 29.

An electrical coil 30 is wound around the exterior of an elongate coil spindle 31 disposed within the housing in axial alignment with sensitive axis 20. The coil spindle has an axial cylindrical bore 32 therethrough. Adjacent its lower end, the coil spindle defines a downwardly facing positioning shoulder 33 which is concentric to the bore 32 and which opens to an enlarged diameter internally threaded recess 34 defined at the lower end of the coil spindle. An externally threaded retainer ring 35 is engaged with the threads of recess 34. The retainer ring defines an axial bore 36 having a diameter sized to make a close fit with the diameter of centering pin 19.

The upper end of the coil spindle is permanently secured, as by weld 38, to an enlarged head 39 of a mounting stud 40 which has an externally threaded, upwardly extending shank 41. Shank 41 passes through a hole 42 which communicates cap chamber 21 with a recess 43 formed in the upper surface of the cap concentric to sensitive axis 20. Stud 40 is maintained coaxial with sensitive axis 20 by cooperation of a positioning shoulder 44 within a mating recess 45 formed in the cap at the lower end of hole 42. The mounting stud is secured to the cap by a nut 46 engaged with the shank thereof in recess 43. An O-ring gasket 47 is engaged between the closure cap and stud head 39 to provide a separable seal between the cap and the mounting stud. When the closure cap is bolted to the housing body, stud 40, retainer ring 35 and centering pin 19 cooperate to position the coil spindle concentric to sensitive axis 20.

The opposite ends of the conductor which defines coil 30 are secured to corresponding ones of terminal elements 27.

In view of the construction described above, it is apparent that when bolts 22 are removed from cooperation with housing body flange 16 the closure cap, the connector body and the coil spindle, including retainer ring 35, are removable as a unit from the housing body.

An elongate cylindrical permanent magnet 50 is disposed within the interior of the coil spindle for reciprocal movement along sensitive axis 20 in response to vibratory forces applied to housing 11 in the direction of the sensitive axis. Adjacent each of its opposite ends, the magnet carries a circumferential bearing ring 51 which may be made of gold-palladium alloy, especially where the vibrometer is to be subjected to high temperature environments; the clearance shown in FIG. 1 between the outer diameter of the bearing rings and the inner diameter of bearing sleeve 53 has been exaggerated for the purposes of illustration. The magnet is mounted within a hermetically sealed container 52 defined by an elongate tubular bearing sleeve 53 and by upper and lower sleeve closure plugs 54 and 55, respectively. The inner diameter of the bearing sleeve is sized to form a sliding fit with the outer diameter of bearing rings 51. The outer diameter of the bearing sleeve is sized to fit within bore 32 of the coil spindle.

Upper sleeve closure plug 54 is hermetically sealed to the bearing sleeve as by welds 56. The lower end of the bearing sleeve defines an outwardly extending peripheral flange 57, lower sleeve closure plug 55 being secured to and hermetically sealed to the sleeve as by welds 58 made around the outer diameter of flange 57. Flange 57 cooperates with spindle positioning shoulder 33 to position the magnet container in a predetermined relation to the coil during use of the vibrometer. Container flange 57 is clamped against positioning shoulder 33 by retainer ring 35.

A hole 60 is formed through lower container plug 55 from a recess 61 which opens to the lower surface of the closure plug. Hole 60 is provided for withdrawing air from the interior of the container and for replacing the evacuated air with a dry inert gas; after the interior of the container has been charged with dry inert gas, hole 60 is hermetically sealed by resistance welding a valve ball 62 across the opening of hole 60 to recess 61.

A pair of coil springs 65 of selected stiffness are engaged one between each end of the magnet and the adjacent sleeve closure plug. The spring cooperate to yieldably bias the magnet into an at-rest position which has a predetermined relation to the length of coil 30. Preferably the at-rest position of the magnet is centrally of the length of the coil.

When vibratory forces are applied to vibrometer 10 in the direction of sensitive axis 20, the magnet functions as a seismic mass in that it tends to remain stationary while the housing moves freely relative to the magnet in response to the applied forces. Accordingly, the magnet moves reciprocally within the housing along sensitive axis 20 relative to coil 30. Such relative movement between the magnet and the coil generates an electrical signal within coil 30, which signal may be monitored as a measure of the velocity of applied vibratory forces or may be integrated to determine the extent the housing is displaced during the production of the signal.

From the construction described above and illustrated in FIG. 1, it is apparent that magnet container 52 is readily removable from the coil spindle once the coil spindle has been removed from the housing body by removing the housing closure cap from the housing body. The container is removable from the coil spindle merely by disconnecting retainer ring 35 from the lower end of the coil spindle.

Since magnet 50 of vibrometer 10 is located within a hermetically sealed container, there is no possibility for foreign matter to enter the interface between bearing rings 51 and bearing sleeve 53 during use of the vibrometer. Thus, the major cause of failure in prior vibrometers is significantly reduced, if not altogether eliminated, in the present transducer. Also, since the magnet of the present vibrometer operates in a controlled atmosphere in the absence of foreign matter, the life of bearing rings 51 is extended significantly over the life of bearing rings in prior devices; the presence of foreign matter on the bearing rings in prior devices accelerated the tendency of such bearing rings to wear. Thus, as a practical matter, the only cause for the magnet to stick relative to the bearing sleeve would be produced by particles abraded from the bearing rings themselves; when the bearing rings have worn to this extent, the magnet capsule is merely replaced. The replacement of the magnet capsule can be accomplished in the field by unskilled labor working under adverse conditions without adverse effect upon the vibrometer itself.

The invention has been described in the context of a vibrometer in which magnet 50 is disposed in a container which is welded closed to be hermetically sealed. It is not necessary to successful practice of this invention that the container be hermetically sealed. It is adequate if the contained is sealed sufficiently to permit entry only of air or the like into the container, but not dust or other foreign matter which would produce clogging or sticking of the magnet relative to the container walls. For example, it has been found that an adequate seal is provided if end closure plugs 54 and 55 are machined slightly oversize relative to the inner diameter of sleeve 53, and the container is then assembled by chilling the closure plugs with liquid nitrogen and inserting them while chilled into the ends of the sleeve. When the container structure stabilizes at a uniform temperatrue, a sufficiently tight interference fit is provided to prevent the entry of contaminating particulate matter into the container, but such a seal between the plugs and the container sleeve may allow air to enter the container as the vibrometer breathes when going from a low pressure environment to a high pressure environment. If desired, the ends of the sleeve may be crimped or swedged over the closure plugs inserted therein by the process described above.

From the foregoing description, it will be seen that this invention maintains the field repairability criterion demanded by users of vibrometers of the type described. Also, since the magnet is contained within a sealed housing, the need for field repair of the vibrometer is substantially reduced relative to the frequency with which field repairs have had to be made to prior vibrometers. It is anticipated that field repair of the present vibrometer would be restricted to replacement of magnet capsules when the bearings therein have become worn, and to repair of broken connections within the coil and between the coil and the terminal elements. A user of the present vibrometer need only maintain a small supply of spare magnet capsules on hand, and replaced capsules may be sent by the used to the manufacturer for reworking. In essence, then, the present invention provides a vibrometer which is essentially insensitive to the environment in which it is used and to the vagaries of personnel charged with the responsibility of field repair of such vibrometers.

What is claimed is:

1. A vibrometer comprising an openable housing, a coil disposed concentric to a sensitive axis of the vibrometer, a magnet disposed in the housing coaxially of the coil, means for mounting one of the coil and the magnet for movement relative to the housing along the sensitive axis and for mounting the other of the coil and the magnet stationary relative to the housing, a container for the movable one of the coil and the magnet and sealed against the entry of contaminating foreign matter thereinto, and means removably mounting the container independently of the other of the coil and the magnet within the housing in fixed relation thereto.

2. A vibrometer comprising an openable housing, a coil aligned in the housing with a sensitive axis of the vibrometer and fixed relative to the housing, a magnet disposed in the housing for movement along the sensitive axis within the coil in response to vibration forces applied to the housing along the sensitive axis, a container sealed against the entry of contaminating foreign matter thereinto disposed within the coil and within which the magnet is disposed for movement as aforesaid, and means removably mounting the container separate from the coil within the housing in fixed relation thereto.

3. In a vibrometer having a sensitive axis and including an openable housing, an elongate hollow coil spindle disposed in the housing in fixed relation thereto concentric to the sensitive axis, a coil wound upon the coil spindle, and a magnet disposed within the coil spindle for movement along the sensitive axis in response to housing displacing forces applied to the housing along the sensitive axis, the improvement comprising an elongate container sealed against the entry of contaminating foreign matter thereinto and within which the magnet is disposed for movement relative to the coil, the container being disposed within the coil spindle so as to be stationary relative to the housing in use of the vibrometer and to be removable as a sealed unit from the housing separate from the spindle.

References Cited

UNITED STATES PATENTS

| 3,463,946 | 8/1969 | Zimmerman | 310—25X |
| 3,100,292 | 8/1963 | Warner, Jr. et al. | 340—17 |

DONOVAN F. DUGGAN, Primary Examiner

U.S. Cl. X.R.

310—25; 336—30; 340—17